United States Patent
Cones, Sr. et al.

[11] Patent Number: 5,101,716
[45] Date of Patent: Apr. 7, 1992

[54] APPARATUS FOR ASSEMBLING BISCUIT SANDWICHES

[75] Inventors: James E. Cones, Sr., Cincinnati; James M. Phelps, Goshen, both of Ohio

[73] Assignee: Planet Products, Inc., Cincinnati, Ohio

[21] Appl. No.: 588,069

[22] Filed: Sep. 25, 1990

[51] Int. Cl.⁵ .......................... A23L 1/31; B65B 25/16
[52] U.S. Cl. .................................. 99/450.5; 99/450.4; 99/537
[58] Field of Search ................ 99/450.1, 450.2, 450.4, 99/450.5, 450.6, 450.7, 494, 537, 538, 357, 356, 443 C, 443 R; 426/524, 274

[56] References Cited

U.S. PATENT DOCUMENTS

| | | | |
|---|---|---|---|
| 2,016,233 | 10/1935 | Herman | 99/450.5 |
| 2,818,097 | 12/1957 | Glanz | 99/537 |
| 3,183,856 | 5/1965 | Jolly | 99/450.4 |
| 3,645,197 | 2/1972 | McMeekin et al. | 99/450.4 |
| 3,762,306 | 10/1973 | Staples | 99/450.7 |
| 3,983,798 | 10/1976 | Crispe | 99/450.4 |
| 4,069,581 | 1/1978 | Gray | 99/537 |
| 4,202,260 | 5/1980 | Weger | 99/450.4 |
| 4,595,099 | 6/1986 | Zaruba et al. | 99/450.5 |
| 4,944,218 | 7/1990 | Cresson | 99/443 C |

Primary Examiner—Timothy F. Simone
Attorney, Agent, or Firm—Kinney & Schenk

[57] ABSTRACT

An apparatus for the assembly of biscuit and meat sandwiches comprises a feeder station for receiving whole biscuits, a slicer station for slicing the biscuits in half, a separator station for separating the two halves of the biscuit and sending them along separate pathways, and an assembly station having a hold station where pre-cooked meat patties are held and where the biscuit halves and the meat patties are assembled into a sandwich ready for packaging. A series of conveyors transport the food components between the stations.

9 Claims, 6 Drawing Sheets

APPARATUS FOR ASSEMBLING BISCUIT SANDWICHES

This invention relates to an apparatus for the assembling of biscuit sandwiches. More particularly, it relates to an apparatus for the assembling of biscuit sandwiches ready for packaging by a series of work stations with interconnecting conveyors for moving food components from station to station.

BACKGROUND OF INVENTION

Packaged foods ready for thawing, warming, and eating have become very commonplace. The foods can be frozen and/or sealed in convenient sized packages by the food processor. The food product can be a large quantity of processed food such as packaged vegetables, individually assembled food products such as sandwiches, or complete dinners with three or more individual food servings. Necessarily, equipment is needed for the efficient packaging of the food product. Quite often the equipment must be individually designed and built for the intended food product to be packaged. The equipment must be capable of receiving food in bulk, separating or segregating it to desired serving sizes and packaging it. The equipment must be capable of handling large amounts of the raw food product in a very fast manner so as to work efficiently and competitively with manual packaging operations.

One food product in particular which is becoming more popular in package form are sandwiches. Hamburger and sausage sandwiches are quite common; however, they typically are not assembled by the food processor and packaged as a complete product ready for consumption. One reason for this is the lack of equipment to efficiently handle bread, buns or biscuits and combine them with a pre-cooked meat patty or fillet in sandwich form.

In accord with a demonstrated need, there has been developed an apparatus of assembling a biscuit and meat sandwich ready for packaging and shipping. The apparatus of the invention is unique and satisfies a need in the food processing industry.

SUMMARY OF THE INVENTION

An apparatus for the continuous assembly of biscuit and meat sandwiches comprises a series of stations. A feeder station is used to receive whole biscuits, said feeder station having a table on which the biscuits are placed and a means to direct said biscuits from the station in a single file. A conveyor means is in operable association with the feeder station to receive the single file biscuits from the feeder station and move them along to a slicer station. Here the biscuits are received from the conveyor and each biscuit is sliced into substantially two halves to create a bottom half and a top half. The sliced biscuits are conveyed to a separator station wherein the sliced biscuits are separated into the two halves of each biscuit and each half directed along separate path ways. A first conveyor means is operably associated with the separator station to move the bottom half of the biscuit to an assembly station and a second conveyor means is operably associated with the separator station to move the top half of the biscuit to the assembly station. The assembly station has a hold table for holding meat patties or fillets. The biscuit bottom half, meat patty or fillet and biscuit top half are manually assembled at the assembly station to form the sandwiches.

DETAILED DESCRIPTION OF THE INVENTION

The apparatus of the invention is comprised of a series of work stations with connecting conveyors. The apparatus is described in detail in the following paragraphs with reference to the drawings. It is particularly useful in the assembly of biscuit and sausage sandwiches and this preferred use is described. However, the apparatus is also useful for the assembly of other sandwiches where a biscuit or bun is sliced into halves and a meat component of any sort, including a pork, beef, chicken and fish patty or fillet is placed between the halves, ready for packaging.

Figure 1:
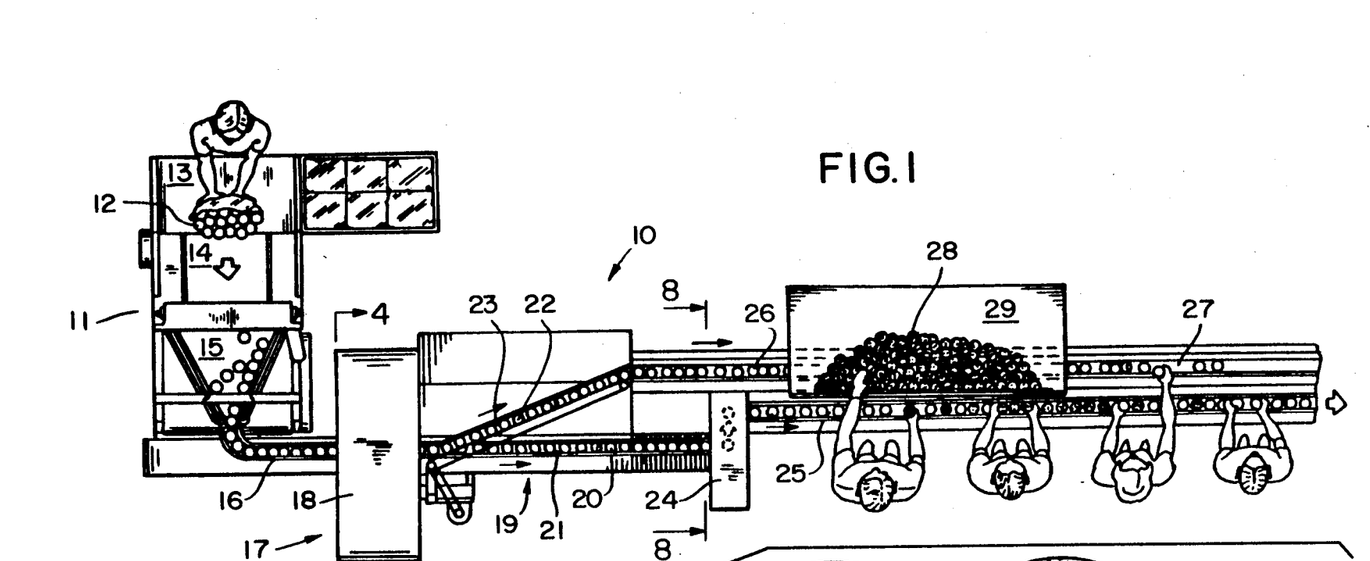
FIG. 1 is a schematic showing the apparatus of the invention.

With reference to FIG. 1, there is shown a schematic of the apparatus 10 in operation. The work stations with conveyors connecting the work stations which are essential to the invention are shown. A brief overview of the invention follows. A worker at a feeder station 11 initially loads biscuits 12 onto a receiving table 13 of the apparatus for further processing. Several whole biscuits are in the process of being removed from their packages and fed along a low speed conveyor 14 and then a high speed conveyor 15 where they are formed into a single file. The biscuits are received on a secondary conveyor 16 and are conveyed still in the single file through a slicer station 17. They are sliced in half by a slicer 18. The sliced, though whole biscuit next is conveyed to a separator station 19. The halves of the sliced biscuit are separated into a biscuit bottom half 20 which moves along a conveyor 21 and a biscuit top half 22 which moves along a conveyor 23. The biscuit bottom half is transferred by an intermittent transfer means 24 to another conveyor 25. The biscuit top half is transferred to another conveyor 26. Conveyors 25 and 26 move the biscuit halves through an assembly station 27. A sausage patty 28 is removed from a hold table 29, placed on the biscuit bottom half and the biscuit top half added thereto. The assembled biscuit and sausage sandwich 30 is then conveyed to a conventional packaging station for packaging and ultimately shipping to the consumer.

Figure 2:
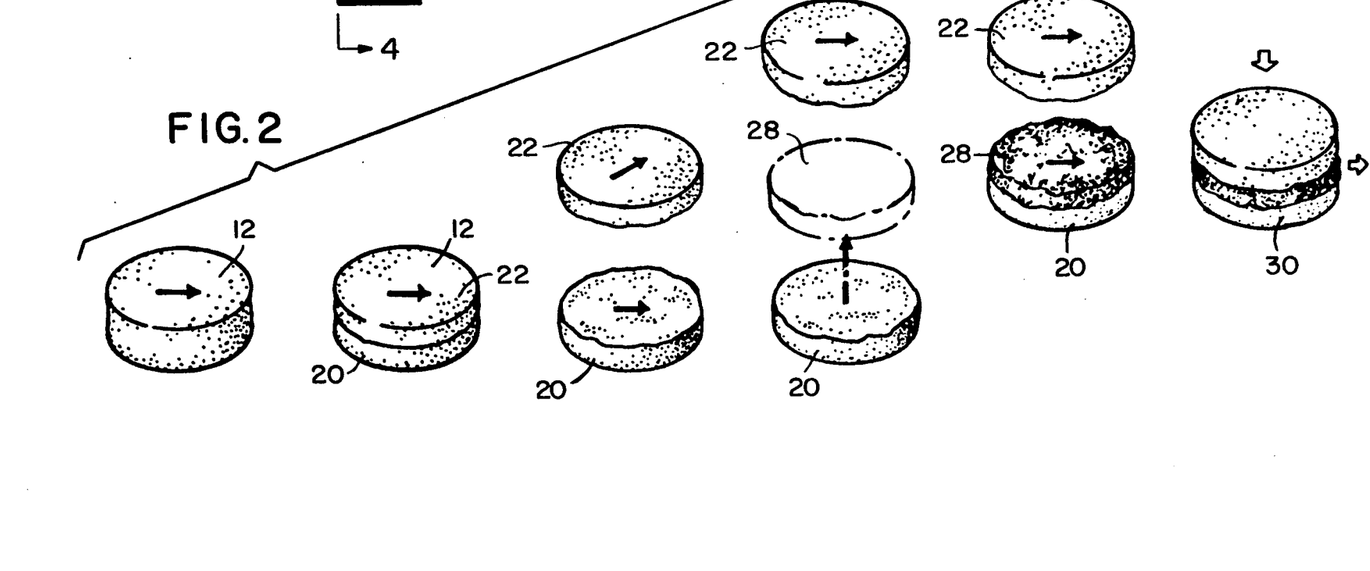
FIG. 2 is a schematic showing the assembly of individual food components to form a biscuit and sausage sandwich in accordance with the use of the apparatus of FIG. 1.

FIG. 2 also gives a schematic overview of the assembly of the food components of the invention. Thus, the whole biscuit 12 is sliced into a biscuit bottom half 20 and a biscuit top half 22, physically separated and moved along separate paths. A sausage patty 28 is placed on the biscuit bottom half 20, and finally the biscuit top half 22 added thereto to form the assembled biscuit and sausage sandwich 30.

Figure 3:
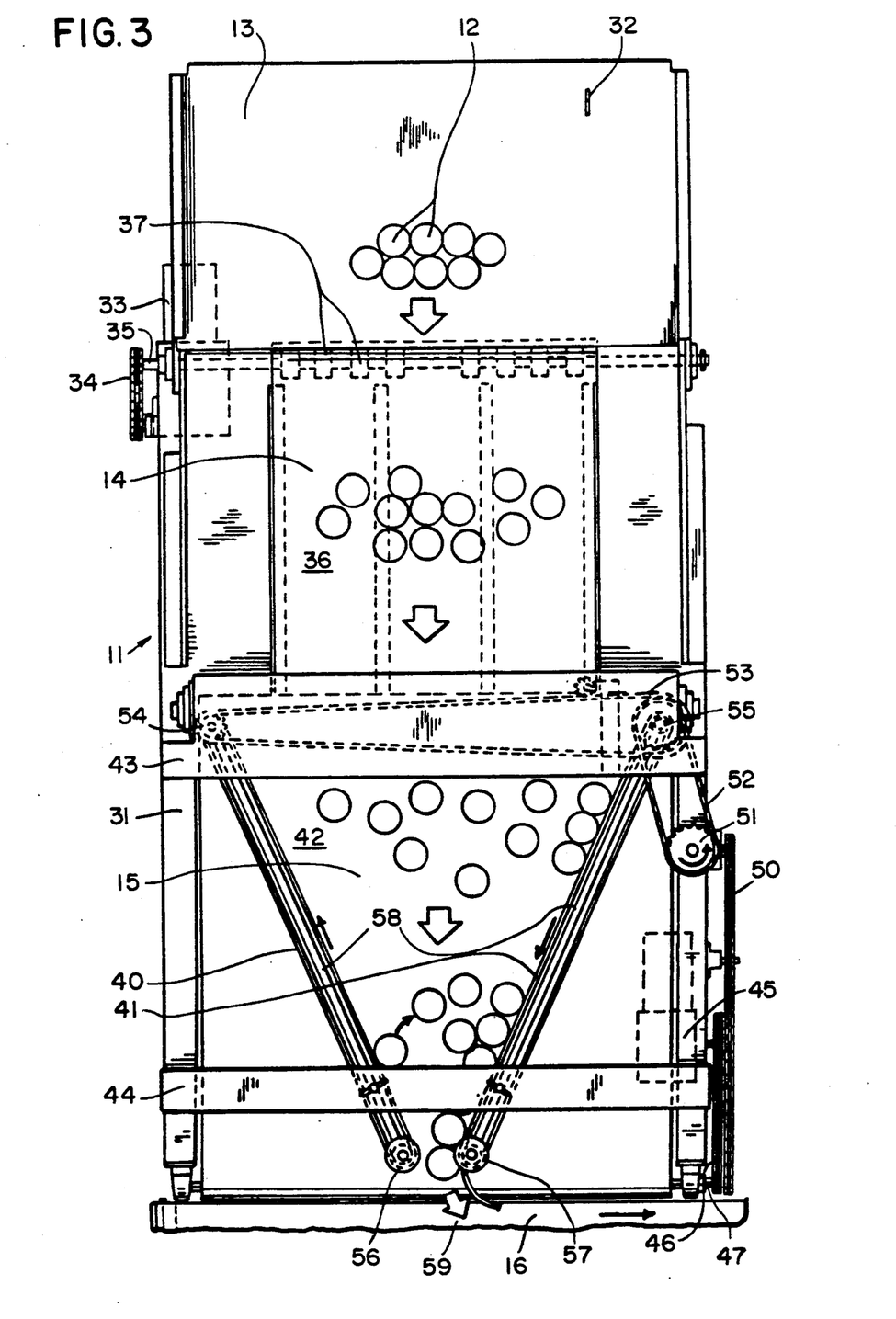
FIG. 3 is a top view of a feeder station of the apparatus of FIG. 1.

The feeder station 11 is shown in detail in FIG. 3. A frame 31 having rigid longitudinal members and vertical support legs has the receiving table 13, low speed conveyor 14 and high speed conveyor 15 mounted on it. The station comprises as one component the receiving table 13 where the whole biscuits 12 are initially loaded, normally by hand. A cutter blade 32 extending from the receiving table's top surface is provided to aid in opening of the packaged whole biscuits. The whole biscuits are manually moved from the receiving table 13 onto the low speed conveyor 14. The conveyor 14 is driven by a motor 33 which conveys power through its output shaft to a sprocket chain 34 so as to drive a shaft 35. The frame 31 also supports the motor 33. An endless belt 36 is positioned on friction rollers 37 mounted on the shaft 35 and a second shaft, each shaft rotatably mounted on the frame. The two shafts have axis of rotation generally parallel to one another. The shaft 35 is driven at a constant speed to cause the belt to travel around both shafts and effect movement of the whole biscuits from the receiving table 13 to the high speed conveyor 15.

The feeder station utilizes the high speed conveyor 15 and guide belts 40 and 41 to force the biscuits received from the low speed conveyor 14 into a single file for further processing. The high speed conveyor 15 is aligned with the low speed conveyor 14 so that the whole biscuits are deposited in a random array onto the conveyor 15. The conveyor 15 has an endless belt 42 positioned on friction rollers mounted on a set of shafts rotatably mounted on the frame 31. The drive means for the conveyor comprises a motor 45, a drive gear (not shown), a sprocket chain 46 and a driven gear (not shown). Power is transferred from the shaft of the motor through the sprocket chain 46 and gears to the shaft 47. The belt 42 is mounted on the shaft 47 and the second shaft so that when the shaft 47 is caused to revolve by the sprocket chain 46 it effects movement of the belt 42. Appropriate gear reducing means is used to get the desired belt speed.

The guide belts 40 and 41 are mounted on longitudinal rigid cross bars 43 and 44 which in turn are mounted on the frame 31. The guide belts are positioned above the endless belt 42 so as to contact the biscuits 12 as they are moved therealong. The motor 45 is also used to drive guide belts 40 and 41. Thus, the sproket chain 46 is in operable association through appropriate gears and shafts to transfer power to a sprocket chain 50 and then to a gear 51. Power is received by the gear 51 and transferred to a sprocket chain 52. This power is transferred to gears and shafts to drive the sprocket chain 53 which is operably connected by gears 54 and 55, respectively to the guide belts 40 and 41. Pulleys 56 and 57 are positioned downstream of the gears 54 and 55 and have the guide belts 40 and 41, respectively mounted on them for continuous travel. The pulleys are mounted on a frame 58 and are suspended above the conveyor 15.

As shown in FIG. 3, the guide belt 40 revolves in a counterclockwise manner so as to contact the biscuit wholes and cause them to move against the natural flow path of the belt 42. The second guide belt 41 is caused to revolve in a clockwise manner and as such travels in the same general direction as the endless belt 42. The guide belt 40 is caused to travel faster than the guide belt 41 because of different sized drive gears. The two guide belts are convergingly angled inwardly in the downstream direction to form an opening between their terminals of sufficient width to allow the passage of a single biscuit. The operation of the endless belt 42 and the guide belts 40 and 41 work in concert to direct the random orientation of biscuits received from the low speed conveyor 14 to a single file of biscuits.

A secondary conveyor 16 is positioned to receive the single file of biscuits from the feeder station 11 and convey them to the slicer station 17. This conveyor is mounted on a frame having rigid longitudinal members and support legs. The conveyor 16 is comprised of an endless belt 59 mounted on rollers and driven by a motor (not shown) in a conventional fashion.

Figures 4, 5:
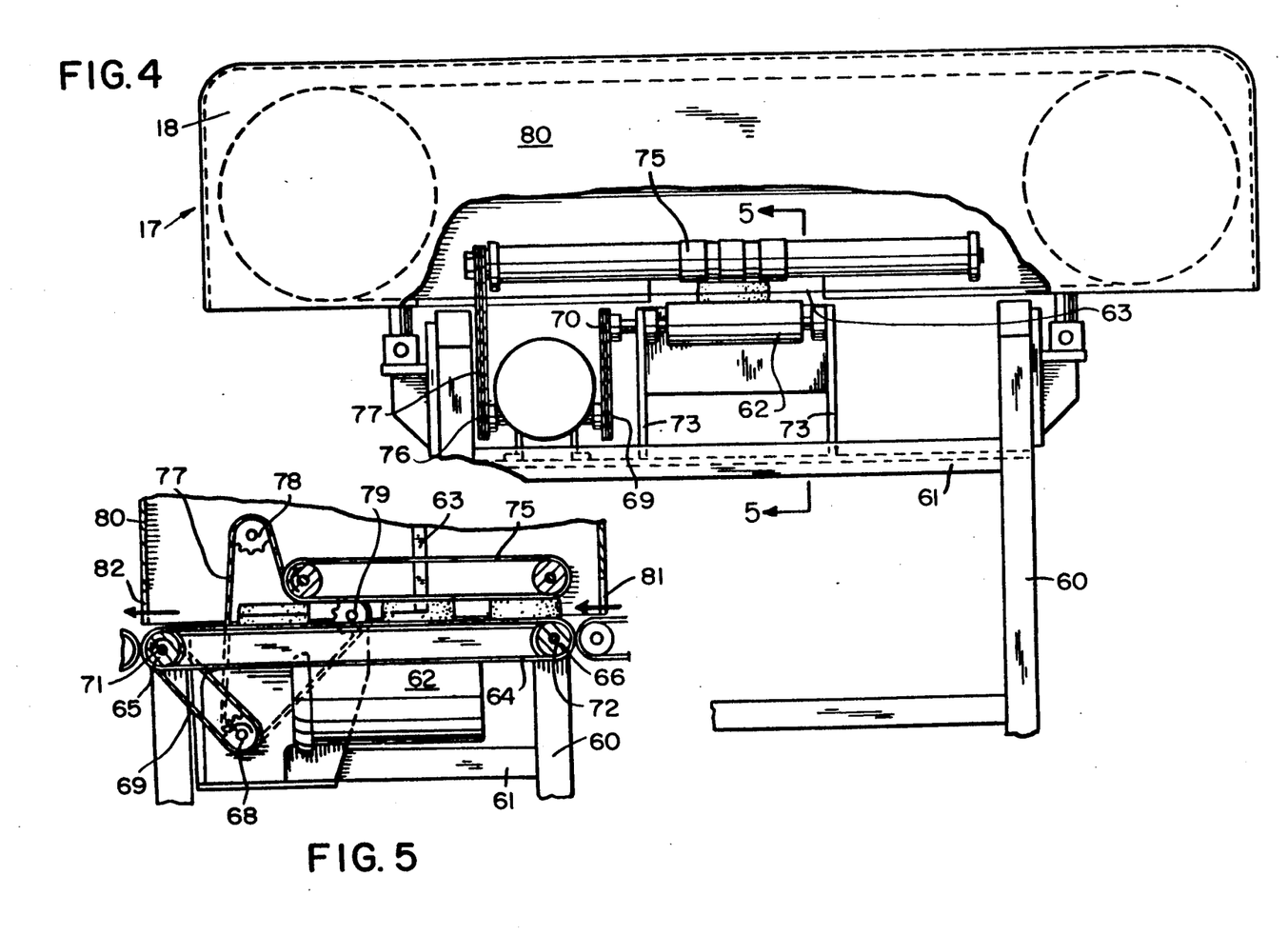
FIG. 4 is a partial side view of the slicer station of the apparatus of FIG. 1.
FIG. 5 is a sectional view of the slicer station of FIG. 4 taken along line 5—5.

With reference to FIGS. 4 and 5, the slicer station has a frame 60 on which is mounted the slicer 18 and a conveyor frame 61 for the conveyor 62, including its drive means. The conveyor 62 is in alignment with the secondary conveyor 16 to receive the whole biscuits in a single file. The biscuits are conveyed through the slicer 18 where a blade 63 of the slicer cuts the whole biscuit horizontally into substantially equal halves. The conveyor 62 is an endless belt 64 mounted on rollers 65 and 66. The drive roller 65 is driven by a motor 67. Power from the motor is received by a gear 68 which in turn drives a sprocket chain 69, a gear 70 and the roller 65. The rollers 65 and 66 are rotatably supported on shafts 71 and 72 along with bearings. The shaft 72 is mounted on pylons 73.

An endless hold-down belt 75 is used in conjunction with the endless belt 64 to steady the biscuits while they are being sliced. The hold-down belt 75 travels around rollers mounted on the slicer frame and is also run by the motor 67. Power from the motor is received by a gear 76. A sprocket chain 77 wraps around the gear 76, a guide roller 78, a drive gear, and another guide roller 79.

For obvious reasons, the endless belt 64 and the hold-down belt 75 travel in the same direction and are spaced sufficiently apart that the whole biscuits are held in place therebetween during the slicing operation, yet are not crushed. Necessarily the two belts are caused to travel at substantially the same speed.

The slicer blade 63 is a part of the slicer 18. A housing 81 holds the slicer blade 63 and is mounted on the frame 60. The slicer blade is positioned above the conveyor 62 a sufficient distance to slice the conveyed biscuits into substantially equal horizontal halves. Openings 81 and 82 are provided in the housing to allow the whole biscuits to enter and exit, respectively.

Figures 6, 7:
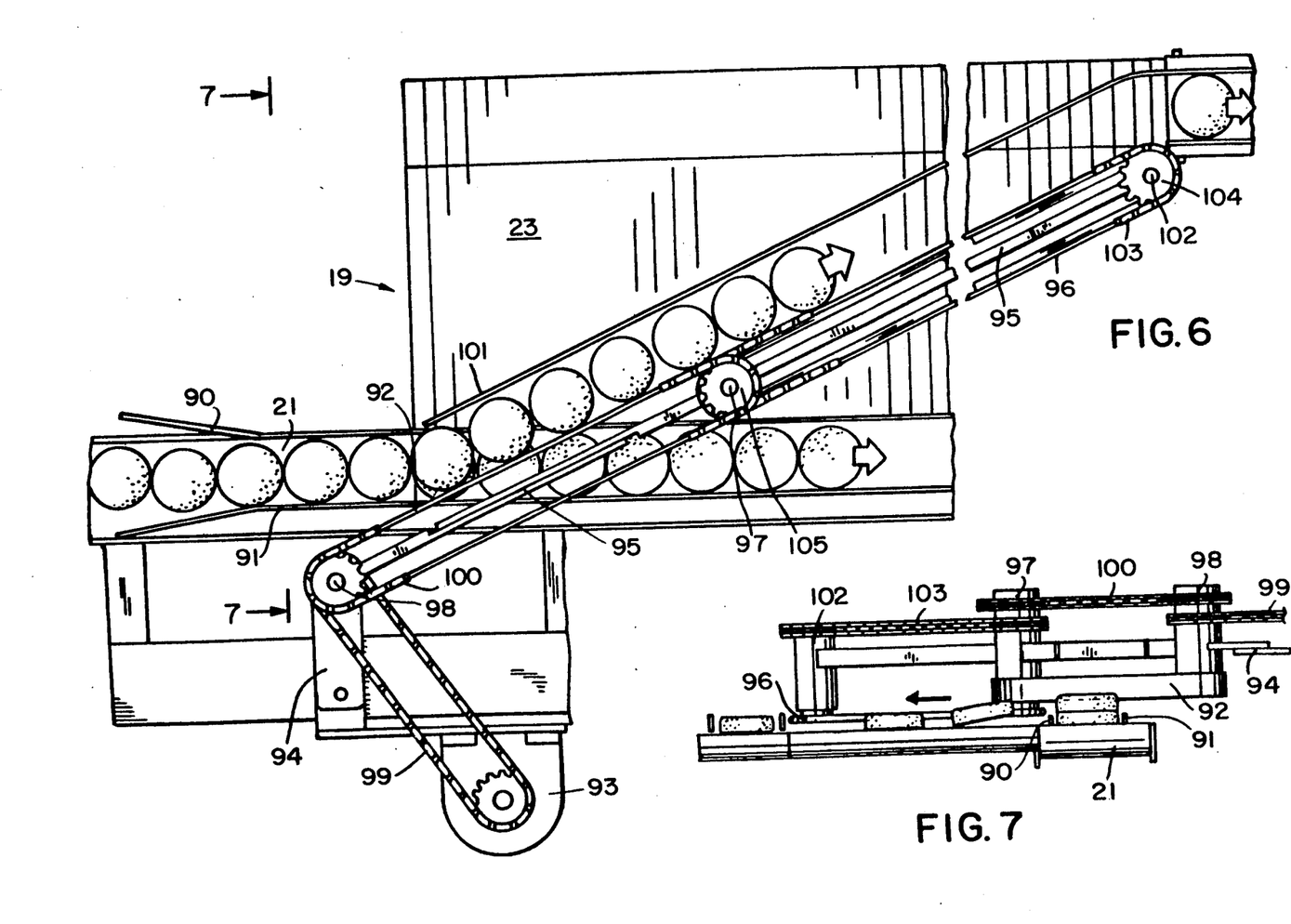
FIG. 6 is a top view of the separator station of the apparatus of FIG. 1.
FIG. 7 is a partial side view of the separator station of FIG. 6 taken along line 7—7.

The biscuits which exit the slicer station 17 next pass to the separator station 19 where the halves of each biscuit are separated and transported along separate pathways. FIGS. 6 and 7 illustrate this aspect of the apparatus. The conveyor 21, in alignment with the conveyor 62 of the slicer station, receives the sliced biscuits in a single file. A set of vertical guide rails 90 and 91 is suspended from the frame above the conveyor 21 to near the approximate height of the bottom biscuit half. The biscuit top half conveyor 23 is an accumulator conveyor and is positioned adjacent the first conveyor 21. Each of these conveyors comprise sets of generally parallel rollers mounted on a frame 93 to allow free rotational movement thereof. The rollers freely rotate to allow the biscuit halves to pass from one roller to the adjacent roller. The two conveyors are used to transport the biscuit halves along the separate pathways. A separator belt 92 is used to separate the two biscuits halves and direct the biscuit top half to the top half conveyor 23. A frame 94 and mount bars 95 extending above the frame 93 of the separator station is used to hold the separator belt and an O-ring belt 96. The separator belt is an endless belt mounted on shafts 97 and 98 and is driven continuously by power delivered by a sprocket chain 99 to a gear and the shaft 98, which in turn drives another sprocket chain 100 and the shaft 97. The separator belt is positioned above the conveyor 21 so as to contact the biscuit top halves, but avoid contact with the biscuit bottom halves.

As best seen in FIG. 7, the sliced biscuit whole is carried along the conveyor 21 until its top half contacts the separator belt 92. The belt is traveling in a generally transverse direction to the travel of the conveyor belt 21. The movement tends to bump the biscuit top half off the bottom half to a side and in effect the biscuit top half is carried in the transverse direction. The biscuit bottom half continues to be carried along the conveyor 21.

The biscuit top half conveyor 23 comprises a set of rollers spaced parallel to one another and sufficiently apart to allow free rotation. They receive the dislodged biscuit top half and carry it to the next station. For this purpose, the O-ring belt 96 and a guide rail 101 mounted above the conveyor 23 are used to guide the biscuit top halves in a single file. The O-ring belt is an endless belt mounted on the shafts 102 and 97. The shaft 102 is caused to turn by means of a sprocket chain 103. This chain is positioned on gears 104 and 105 placed on shafts 102 and 97, respectively. Power from the sprocket chain 99 drives both the separator belt and the O-ring belt.

The O-ring belt 96 and the guide rail 101 are substantially parallel and are caused to run in a generally downstream direction of the conveyor 23. Ultimately, the biscuit top halves are guided to the assembly station 27 in a single file and assembled into a sandwich as further discussed below.

Figure 8:
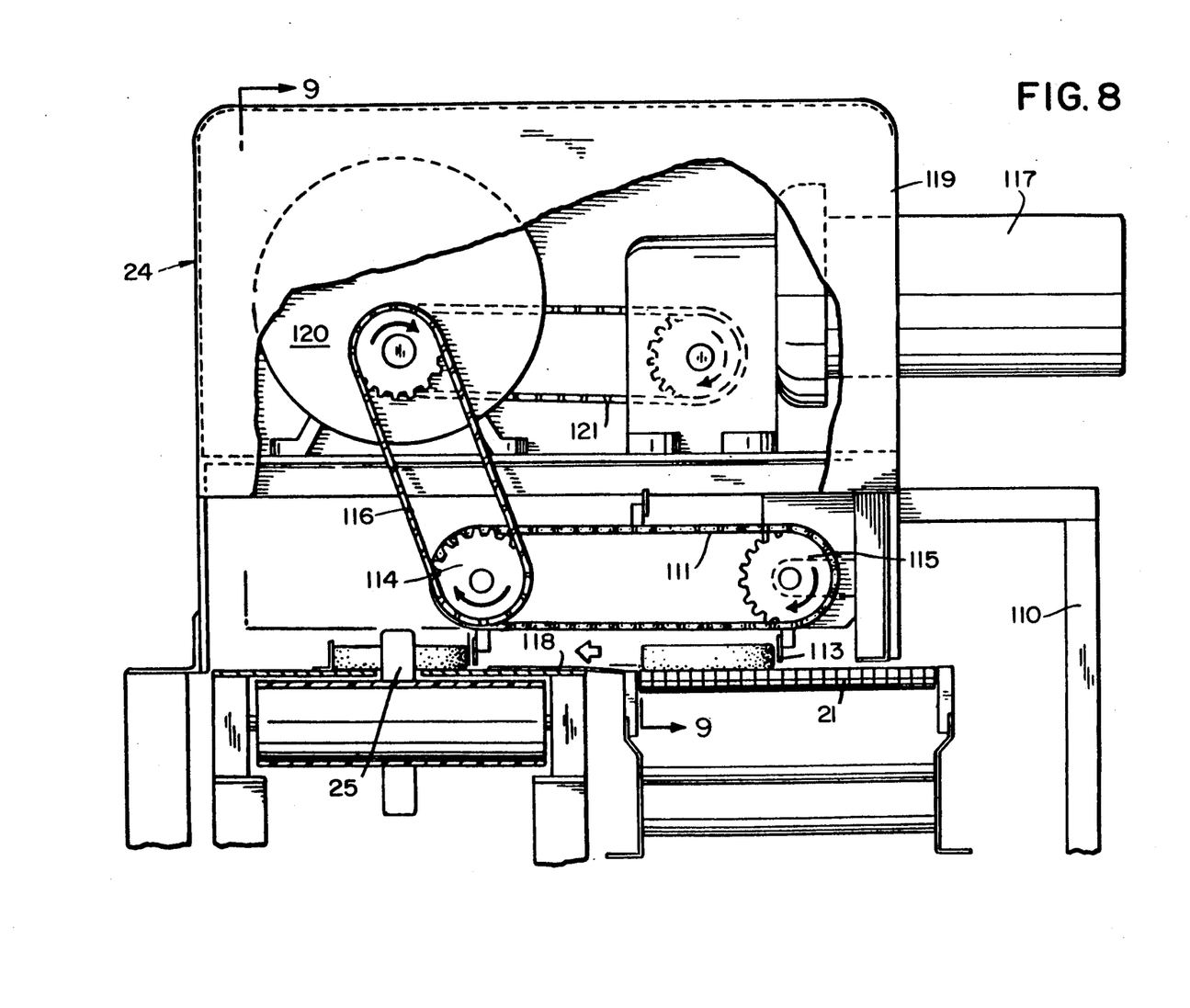
FIG. 8 is a side view taken in section of a portion of the separator station of FIG. 6 showing a transverse movement of the biscuit bottoms.
Figure 9:
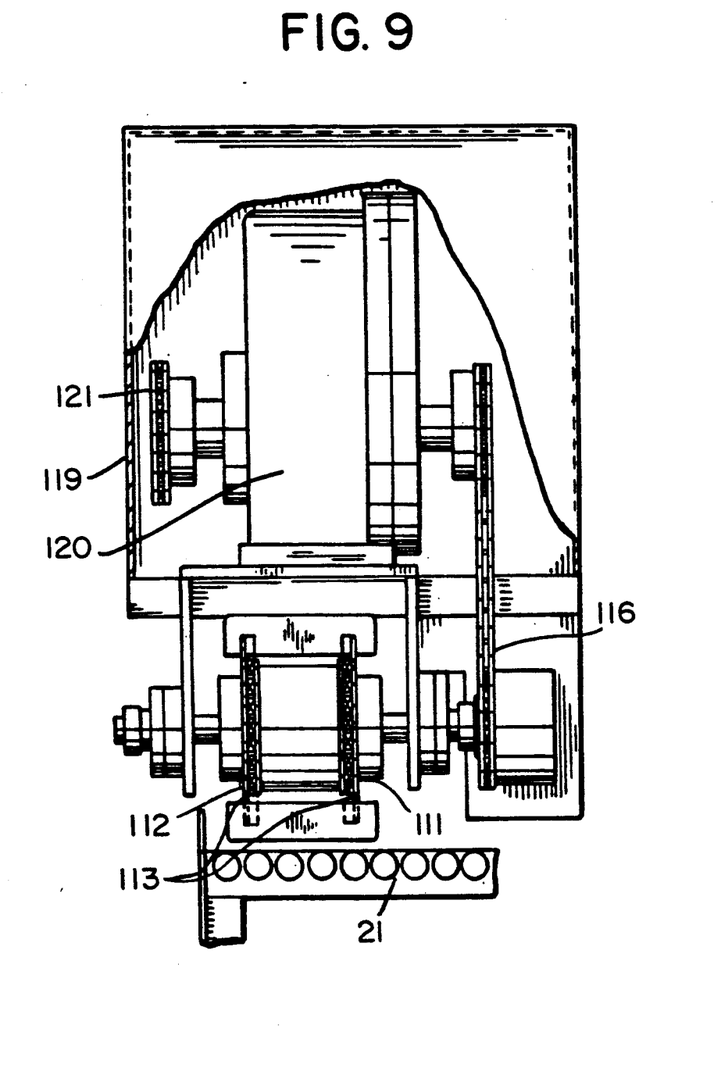
FIG. 9 is a partial front view in section of the separator station of FIG. 8 taken along line 9—9.

The biscuit bottom halves are transferred from the conveyor 21 of the separator station to a conveyor 25 of the assembly station 27 by means of an intermittent transfer means 24 best shown in FIGS. 8 and 9. A frame 110 with rigid longitudinal members and vertical support legs is used to hold the transfer means. A set of endless pusher chains 111 and 112 with pusher pins 113 placed thereon is positioned on the frame 110 to run transverse to the conveyor 21. The pusher chain 111 is mounted on gears 114 and 115 as shown in FIG. 8. The pusher chain 112 is similarly mounted. The pusher chains are made to revolve about their gears by a drive chain 116, which in turn is operably connected by gears and powered by a motor 117. A support shelf 118 mounted on the frame 110 directly below the pusher chains receives the biscuit bottom halves and provides a means on which the halves slide during their transfer.

An intermittent drive unit 120 is operably associated with the pusher chains 111 and 112 and is driven by the motor 117 by a sprocket chain 121 and gears. The intermittent drive unit ensures a predetermined timed conveyance of the biscuit bottom halves to the assembly station. A housing 119 contains the transfer unit. In operation, a pair of biscuit bottom halves advance along the conveyor 21 until they are juxtaposed the pusher chains 111 and 112. The spaced pusher pins 113 on the pusher chains contact the respective biscuit halves to push them along the pusher chains' travel paths and deposit them onto the conveyor 25.

Referring once again to FIG. 1, the biscuit bottom halves and biscuits top halves are conveyed to the assembly station 27 from the separator station 19. The assembly station 27 comprises a frame with the hold table 29 for the sausage patties, the conveyor 25 conveying the biscuit bottom halves so positioned to run along the length of the hold table, and the conveyor 26 conveying the biscuit top halves and also positioned to run along the length of the hold table. The conveyor 25 comprises a driven endless belt with spaced pusher pins extending therefrom. The endless belt is positioned on rollers rotatably mounted on the assembly station frame. The conveyor 26 comprises a driven endless belt also positioned on rollers rotatably mounted on the assembly station frame. The hold table and conveyors are mounted on the frame of the assembly station to be within easy reach of workers standing along side of the station.

Initially, the hold table is loaded, normally manually, with the sausage patties. The patties are precooked and preferably frozen, though need not be provided they are subsequently frozen or specially packaged. It should be readily apparent that the biscuit and sausage sandwiches are assembled by manually combining the food components. As shown, this is accomplished by a first worker removing a sausage patty from the hold table 29 and placing it on a biscuit bottom half. A second worker removes a biscuit top half from its conveyor and places it on the sausage and biscuit bottom half as it is conveyed past him. Once assembled, the sandwiches are conveyed further along by the conveyor 25.

The thus assembled sandwich is now ready for package and ultimate shipment to the consumer. The conveyor carrying the complete sandwich is operably associated with a packaging conveyor of a conventional packaging machine or leads to one. Such machines are conventional in nature and need not be illustrated or described for purposes of the invention.

In operation, a worker initially loads whole biscuits onto the receiving feeder table. The biscuits are conveyed by a low speed conveyor to a high speed conveyor in alignment therewith. The high speed conveyor with converging guide belts forces the biscuit wholes into a single file. The biscuits move by way of the single file into a slicer where they are sliced into substantially equal halves. The sliced whole biscuits are then conveyed to a separator station where a generally transverse separator belt contacts the biscuit top half and forces it onto a conveyor. The biscuit bottom halves continue until they reach a transfer means where they are intermittently moved onto another conveyor. The biscuit bottom halves and top halves are finally conveyed to an assembly station where workers manually combine the biscuit halves and meat patties to form sandwiches.

The invention has been described in particularity with reference to the drawings. It should be recognized that modifications and variations of an obvious nature are within the scope of the invention and the following claims.

What is claimed is:

1. An apparatus for the continuous assembly of biscuit and meat sandwiches, comprising:
   (a) a feeder station to receive whole biscuits, said feeder station having a receiver table on which the biscuits are placed and a conveyor means to direct said biscuits from the table in a single file;

(b) a secondary conveyor in operable association with the feeder station to receive the single file biscuits from the feeder station;

(c) a slicer station having a conveyor in alignment with the secondary conveyor wherein the biscuits are received from said conveyor and further having a slicer positioned above the conveyor for slicing each biscuit into substantially equal halves to create a bottom half and a top half;

(d) a separator station having a first separator conveyor wherein the sliced biscuits are received, said separator station having a means to separate the halves of each biscuit and direct each half along separate path ways wherein the first separator conveyor is operably associated with the separator means to move the biscuit bottom half to an assembly station and a second separator conveyor is operably associated with the separator means to move the biscuit top half to the assembly station; and (e) an assembly station having a hold table for holding meat patties, a first conveyor in alignment with the first separator conveyor of the slicer station to receive the biscuit bottom half and convey it past the hold table and a second conveyor in alignment with the second conveyor of the slicer station to receive the biscuit top half and convey it past the hold table so that the biscuit bottom half, sausage patty and biscuit top half can be readily assembled to form the biscuit and meat sandwiches.

2. The apparatus of claim 1 wherein the conveyor means of the feeder station is a low speed conveyor positioned adjacent the receiving table and a high speed conveyor in alignment with the low speed conveyor, said high speed conveyor capable of receiving the whole biscuits in a random array from the low speed conveyor and forcing them into a single file.

3. The apparatus of claim 2 wherein the high speed conveyor has an endless belt on which the biscuits are moved and a set of guide belts positioned above the endless belt a sufficient distance to contact the biscuits, said guide belts being convergingly angled inwardly in the downstream direction to form an opening between their terminals of sufficient width to allow the passage of a single biscuit.

4. The apparatus of claim 3 wherein the slicer further has an endless hold-down belt in association with the slicer's conveyor and sufficiently close to receive the whole biscuit therebetween without crushing the biscuit.

5. The apparatus of claim 4 wherein the separator means in the separator station to separate the biscuit halves is an endless separator belt traveling in a generally transverse direction to the first separator conveyor, said separator belt positioned above the first separator conveyor a sufficient distance to contact only the biscuit top half as the whole biscuit is moved along the first separator conveyor and further having a second separator conveyor in operable association with the separator belt to receive the biscuit top halves as they are removed from the sliced biscuit, said first separator conveyor and second separator conveyor travelling in the same general direction.

6. The apparatus of claim 5 wherein the second separator conveyor has an endless O-ring belt and a guide rail substantially parallel to one another and spaced sufficiently apart to guide a single file of biscuit top halves along said second separator conveyor.

7. The apparatus of claim 6 further comprising a transfer station comprised of a transverse conveyor in alignment with the first separator conveyor to receive at least one biscuit bottom half and intermittent means associated with the transverse conveyor to move the biscuit bottom half in a timed fashion to the assembly station first conveyor.

8. The apparatus of claim 7 wherein the transverse conveyor is capable of receiving two biscuits bottom halves and moving them in a timed fashion.

9. The apparatus of claim 1 further comprising a packaging conveyor operably associated with the assembly station to move the assembled sandwich to a packaging station.

* * * * *